United States Patent
> Fleury

[15] 3,690,688
[45] Sept. 12, 1972

[54] AUTOMOTIVE HYDROELASTIC SUSPENSION WITH LEVEL CORRECTION

[72] Inventor: Jacques Fleury, 117/167 quai Andre Citroen, Paris, France

[22] Filed: Nov. 12, 1970

[21] Appl. No.: 88,537

[52] U.S. Cl. ............280/6 H, 280/124 E, 267/65 D
[51] Int. Cl. .............................................B60g 17/00
[58] Field of Search ..............280/124 F, 6; 267/65 D

[56] References Cited

UNITED STATES PATENTS

| | | | |
|---|---|---|---|
| 3,002,765 | 10/1961 | MacDuff | 280/124 F |
| 3,071,394 | 1/1963 | Miller | 280/124 F |
| 3,163,412 | 12/1964 | Troy | 280/124 F |

*Primary Examiner*—Philip Goodman
*Attorney*—Wenderoth, Lind & Ponack

[57] ABSTRACT

Hydro-elastic suspension system of vehicle, comprising hydraulic receiving devices interposed between the body of the vehicle and the wheels, and for each train of wheels a hydraulic distributor connected to the corresponding hydraulic receiver and adapted to either connect said receivers to a source of fluid under pressure, or isolate them, or connect them to the exhaust, as well as a device for correcting the ground clearance of the vehicle body, this correcting device comprising an elastic operative connection, with delay-action means, disposed between the wheels of the vehicle and the corresponding distributor, characterized in that said elastic operative connection comprises a hydraulic system for transmitting the wheel movements to the movable members of said distributors, with hydraulic time-lag means.

7 Claims, 5 Drawing Figures

Patented Sept. 12, 1972
3,690,688
2 Sheets-Sheet 1
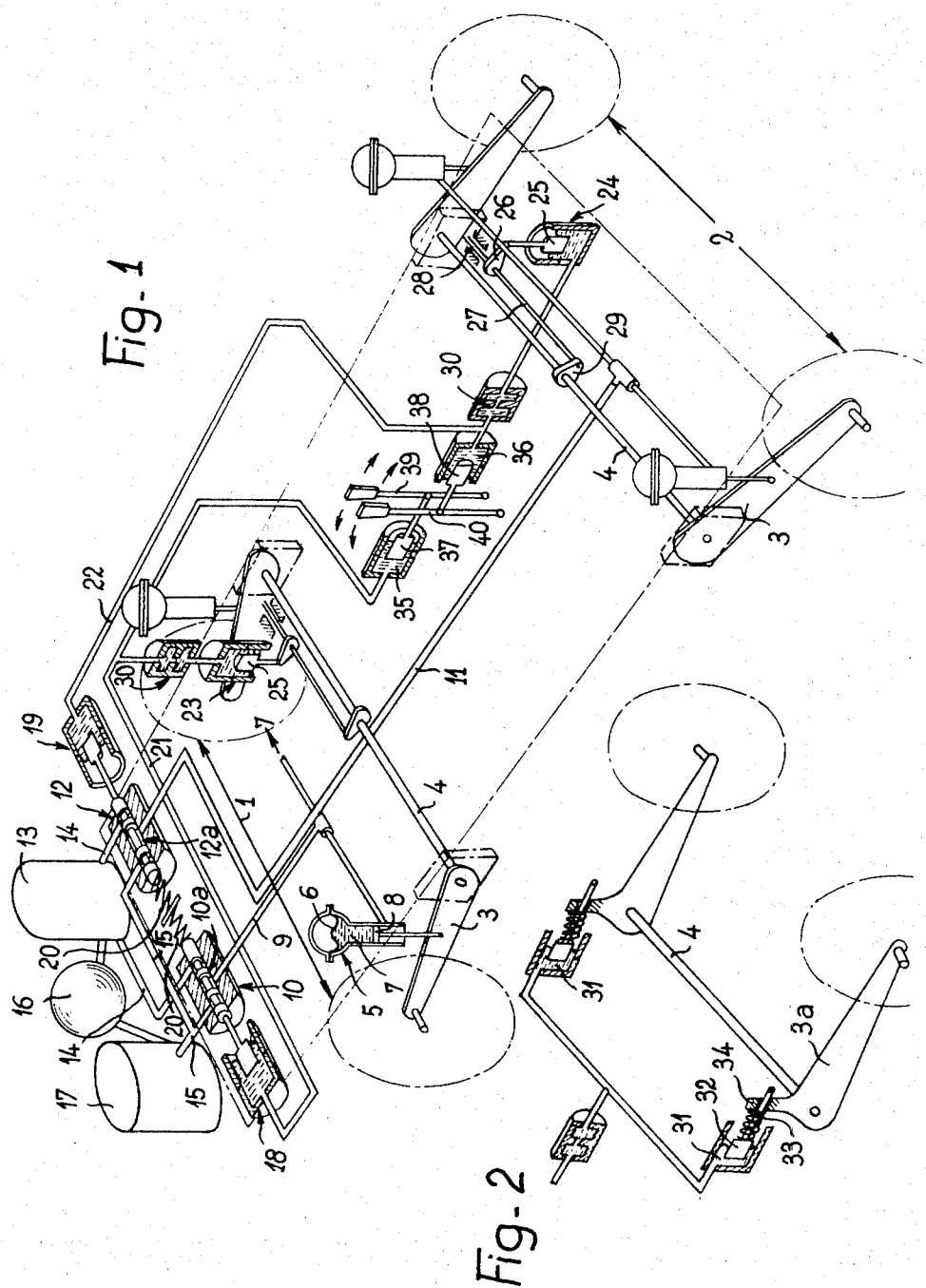
JACQUES FLEURY, Inventor
By Wenderoth, Lind Ponack
Attorneys

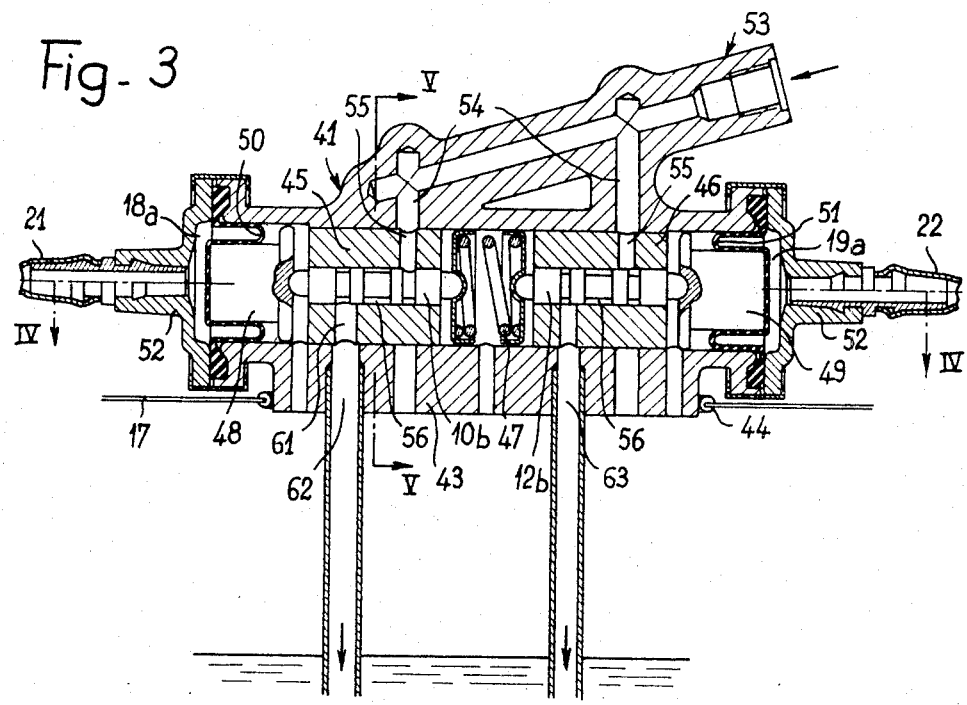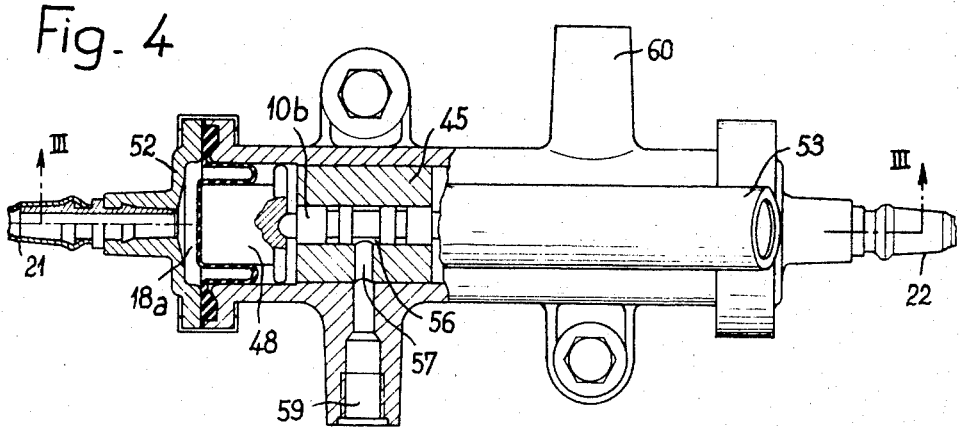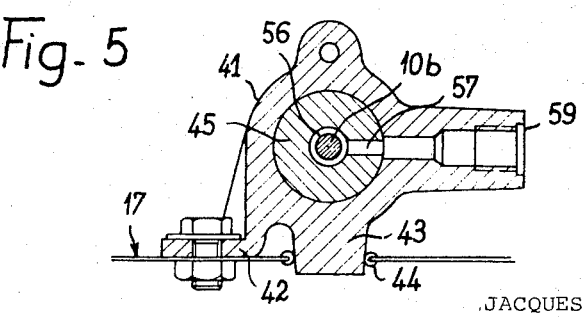

AUTOMOTIVE HYDROELASTIC SUSPENSION WITH LEVEL CORRECTION

The present invention relates in general to suspension systems of motor vehicles and has specific reference to a hydro-elastic suspension system incorporating level correcting means and wherein each wheel suspension unit comprises, in addition to a suspension spring which may be either metallic or pneumatic, a hydraulic receiver interposed between the wheel and the vehicle body, and of which the fluid supply is controlled by a distributor constituting one element of the level correcting means.

In hitherto known hydro-elastic suspension systems comprising level correcting means the distributors are controlled as a rule mechanically or electro-mechanically, or sometimes by vacuum, responsive means and various timing or delay-action devices are provided for avoiding an abnormally recurrent and useless operation of the distributors in response to rapid beats of the suspension.

It is the essential object of the present invention to provide a simple yet efficient design of the correcting device whereby all linkage systems hitherto characterizing mechanical arrangements are definitely eliminated as well as the use of any source of power requiring the aforesaid electromechanical or vacuum control arrangements, with all the connecting pipework and wiring necessary therefor.

Basically, the hydro-elastic suspension system for motor vehicle according to the present invention, which comprises hydraulic receivers interposed between the vehicle body and the road wheels, and for each train of wheels a hydraulic distributor connected to the corresponding hydraulic receivers and adapted either to connect these receivers to a source of fluid under pressure, or to isolate them, or to connect them to the exhaust, with a device for correcting the height or level of the vehicle body above the ground, which comprises a delay-action elastic connection between the wheels and the corresponding distributor, is characterized in that said delay-action elastic connection comprises hydraulic means for transmitting the wheel movements to the movable members of the distributors and a hydraulic timer.

This arrangement is advantageous inter alia in that it permits of grouping the distributors in close vicinity of the fluid reservoirs, thus reducing the length of the pipework necessary for the return lines from the hydraulic receivers. The hydraulic transmission implemented is easier to install than mechanical linkages and rods (thus eliminating difficulties due to space and dimensions, the choice of possible paths, etc.).

Furthermore, the arrangement contemplated in the present invention is advantageous in that it permits of adjusting at will and without difficulty the desired height or level of the suspension by simply incorporating in the hydraulic transmission a variable control vessel with manual regulation, this regulation applying if desired to each train of wheel or being common to both front and rear trains of wheels of the vehicle.

Various forms of embodiment of the present invention will now be described by way of example with reference to the attached drawings, in which:

FIG. 1 is a diagrammatic perspective view of a suspension system of motor vehicle according to this invention;

FIG. 2 is a diagrammatical fragmentary view of the suspension of a train of wheels, to illustrate a modification of the level detecting means;

FIG. 3 is a section taken along the line III—III of FIG. 4, showing a distributing unit for the correcting means of this invention;

FIG. 4 is a sectional view of the same unit, taken along the line IV—IV of FIG. 3, and FIG. 5 is a section taken along the line V—V of FIG. 3.

The suspension illustrated in FIG. 1 is of the hydropneumatic type and comprises a front train of wheels 1 and a rear train of wheels 2; in this example these trains of wheels are of the independent wheel type comprising wheel supporting arms 3 interconnected by an anti-roll torsion bar 4 and pivoted coaxially therewith to the vehicle body in a known manner not shown in the drawings.

Between the body of the vehicle and each wheel supporting arm a hydropneumatic unit is interposed; this unit comprises a body 5 secured to the vehicle structure and enclosing a chamber or vessel filled with gas under pressure to constitute a spring-like element, separated by a diaphragm 6 from another chamber constituting a hydraulic cylinder 7 having its piston 8 connected to the wheel arm 3.

The hydraulic cylinders 7 of a same train of wheels communicate directly with each other; those associated with the front train are connected via a pipe line 9 to a distributor 10 and those of associated with the rear train are connected via another pipe line 11 to a distributor 12. These distributors comprise a spool valve 10a, 12a respectively, adapted to:

either connect pipe lines 9, 11 and therefore cylinders 7 to a source of fluid under pressure 13 via pipe lines 14, this source 13 being shown in this example in the form of an accumulator of fluid under pressure connected to a supply pump 16 drawing fluid from a reservoir 17;

or isolate the receiving cylinders 7 from the source of fluid under pressure, in the inoperative position of each spool valve as shown in the drawing;

or connect the cylinders 7 to the exhaust, i.e., to reservoir 17, via pipe lines 15.

These spool valves are controlled through a hydraulic transmission comprising for the two spool valves of FIG. 1 a pair of receiving vessels 18, 19 for actuating the stems of said spool valves in the axial direction, in opposition to a pair of return spring 10, and connected through pipe lines 21 and 22 respectively to variable capacity vessels 23, 24 for detecting the variations in height or level of the vehicle body at the front and rear trains thereof.

More particularly, in the case illustrated in FIG. 1, each train of wheels comprises only one variable-capacity vessel. To this end, the body of said vessel is mounted in a fixed position on the vehicle body and its movable wall, consisting of a diaphragm, is connected through a bearing piston 25 to the outer end of an arm 26 rigid with a bar 27 having one end supported at 28 by the vehicle body and the other end rigid with the end of another arm 29 secured to the central portion of the corresponding anti-roll bar 4; under these conditions, the angular position of this arm 29 corresponds to the average suspension level or height of the corresponding train of wheel. The bar 27 introduces a control resiliency combined with the use of a throttle-type hydraulic timer or like delay-action device 30 inserted in the corresponding pipe line 21 or 22. However, this resiliency could also be introduced into said variable capacity vessel 23 or 24 or into the timer before its throttled passage, in the form of an elastic chamber, and in this case the piston 25 may be controlled directly from said arm 29.

Another arrangement according to this invention which is illustrated in FIG. 2 consists in associating a variable capacity vessel 31 with each wheel; the piston 32 of this vessel 31 bears against a diaphragm and is responsive to a spring 33 co-acting directly with a bearing member 34 rigid with corresponding wheel supporting arm 3a and surrounding the piston rod acting as a spring guide. The fact of using two variable capacity chambers is somewhat balanced by the fact that the control thereof is much simpler and accessible, and leaves the anti-roll torsion bar completely free.

From the foregoing it is clear that in case of overloading causing a reduction in the ground clearance of the vehicle body at one or both trains of wheels a corresponding variation either in the volume of the variable capacity vessels 23, 24 of FIG. 1, or in the average volume of vessels 31 in the case of FIG. 2, thus implying with the delay introduced by the throttle-type timer or timers 30, a corresponding variation in the volume of the corresponding receiving vessels 18 or 19, and therefore a movement of the spool valve of distributor 10 or 12 in the direction to communicate the pressure-fluid supply pipe lines 14 with the pipe lines 9 or 11 connected to the hydraulic receivers 7, so that these receivers 7 become operative to raise the body of the vehicle to its preset level or height whereat the variable capacity vessels 23, 24 or 31 resume their initial volume or volumes corresponding to the inoperative positions of the distributor spool valves.

If on the contrary the vehicle body is unloaded, the correcting device will operate in the reverse manner to restore said preset level or height.

Moreover, the arrangement comprises a manual control device for enabling the driver to preset at will the mean level or ground clearance of the suspension system, notably with a view to facilitate wheel-changing operations. This manual control device comprises at least one manually-operated variable-volume capacity or vessel (the arrangement illustrated in FIG. 1 actually comprising two such vessels : one 35 for controlling the level or ground clearance of the front train of wheels and the other 36 for controlling separately the level or ground clearance of the rear train of wheels), inserted in the pipe lines 21 and 22 between the timers 30 and the receiving vessels 18, 19 controlling the aforesaid distributors. In this example each vessel 35 or 36 comprises a cylinder with a piston slidably mounted therein which bears against a diaphragm, the piston rod being adapted to be actuated directly through a separate control lever 39 or 40, respectively, In FIG. 1 it will be seen that the vessels 35, 36 and control levers 39, 40 are so disposed that these control levers are moved in the same direction for obtaining a similar result in the two trains of wheels; besides, these vessels and levers may be provided with coupling means adapted to be uncoupled at will. Furthermore, these control levers 39, 40 may be disposed within easy reach of the driver of the vehicle, for example on the instrument panel or facia board of the vehicle, however without overlooking the fact that these control means are associated with a hydraulic transmission.

In actual practice, the distributors may advantageously be combined into a single unit installed as near as possible to the fluid reservoir 17, in order to minimize the length of return pipe lines.

A typical and exemplary form of embodiment of a distributor unit of this character is illustrated in FIGS. 3 to 5 inclusive. It comprises a body 41 formed with an integral lug 42 for securing it to the lid of the fluid reservoir 17, and a manifold 43 closely fitting within an aperture formed on the top of said lid, a suitable gasket 44 being interposed between the edge of said aperture and said manifold. In a bore formed through the body 41 a pair of valve cylinders 45, 46 are force fitted in a fixed position and receive in their aligned bores the spool valves 10b and 12b of the front and rear correcting devices. Between the two adjacent ends of these spool valves a common return spring 47 is disposed, its ends engaging corresponding cups engaged in turn by said spool valves, as shown.

The outer or opposite ends of said spool valves 10b, 12b engage pistons 48, 49 respectively which penetrate into glove-finger diaphragms 50, 51 forming between the body 41 and end pieces 52 secured thereto a pair of variable-volume chambers 18a, 19a connected to corresponding pipe lines such as 21 and 22 of FIG. 1.

The body 41 comprises an integral pipe 53 for connective same to a source of fluid under pressure, with ducts 54 communicating with radial ports 55 formed through the walls of valve cylinders 45, 46 for supplying fluid under pressure to spool valves 10b, 12b.

Central grooves 56 of spool valves 10b and 12b normally register with ports 57 communicating with pipes 59 adapted to be connected to the fluid supply pipe lines of hydraulic receivers 7, such as pipe lines 9 and 11 of FIG. 1.

Diametrally opposite to ports 55 in relation to grooves 56 are other ports 61 formed in the valve cylinders 45, 46 and connected to exhaust ducts 62, 63 formed in said manifold 43.

Other ports and ducts without reference numerals but shown in FIG. 3 are formed in said manifold for returning directly to the reservoir any leakage fluid from this distributor unit.

It is clear that the function of grooves 56 is to connect the ports 57 communicating with receivers 7 either with the supply ports 55 or with the exhaust ports 61 according to the direction of movement of the relevant spool valve; in the inoperative position shown in the drawing these grooves are isolated from both ports 55 and 61.

Of course, various modification and variations may be applied to the specific forms of embodiment of the present invention which are shown and described herein, without departing from the scope and basic principle of the invention as set forth in the appended claims.

What is claimed as new is:

1. Hydro-elastic suspension system of vehicle, comprising hydraulic receiving devices interposed between the body of the vehicle and the wheels, and for each train of wheels a hydraulic distributor having movable members connected to the corresponding hydraulic receiver and adapted to either connect said receivers to a source of fluid under pressure, or isolate them, or connect them to the exhaust, and a correcting device for correcting the ground clearance of the vehicle body comprising an elastic operative connection having delay-action means disposed between the wheels of the vehicle and the corresponding distributor, said elastic operative connection comprising a hydraulic system for transmitting the wheel movements to the movable members of said distributors and hydraulic time-lag means.

2. Hydro-elastic suspension system as set forth in claim 1 wherein a fluid reservoir is provided and said distributors are assembled into a common unit located adjacent said fluid reservoir.

3. Hydro-elastic suspension system as set forth in claim 1 wherein said hydraulic transmission comprises at least one manually-controlled variable-volume control vessel inserted between said time-lag means and said distributor, whereby the driver can preset at will the ground clearance of the body at one of said trains of wheels.

4. Hydro-elastic suspension system according to claim 1, wherein said hydraulic transmission comprises for each wheel of at least one train, a variable-capacity vessel for detecting the variation occurring in the ground clearance.

5. Hydro-elastic suspension system according to claim 1, wherein said hydraulic transmission comprises for each train of wheels a single ground-clearance detecting variable-capacity vessel connected to a lever disposed centrally of the anti-roll torsion bar.

6. Hydro-elastic suspension system according to claim 4 wherein said variable capacity vessel is connected by spring means to a movable member of the wheel suspension, said spring means constituting said elastic operative connection.

7. Hydro-elastic suspension system according to claim 2 wherein said distributors are mounted on the top of said fluid reservoir and comprise fluid return ducts opening dire directly into said reservoir.

* * * * *

UNITED STATES PATENT OFFICE
CERTIFICATE OF CORRECTION

Patent No. 3,690,688 Dated September 12, 1972

Inventor(s) JACQUES FLEURY

It is certified that error appears in the above-identified patent and that said Letters Patent are hereby corrected as shown below:

In the printed heading of the Letters Patent insert in its appropriate space:

"Assignee: SOCIÉTÉ ANONYME AUTOMOBILES CITROËN, Paris, France" and

"Foreign Application Priority Data

November 26, 1969 - France 69/40.792"

Signed and sealed this 3rd day of April 1973.

(SEAL)
Attest:

EDWARD M. FLETCHER, JR.
Attesting Officer

ROBERT GOTTSCHALK
Commissioner of Patents